UNITED STATES PATENT OFFICE.

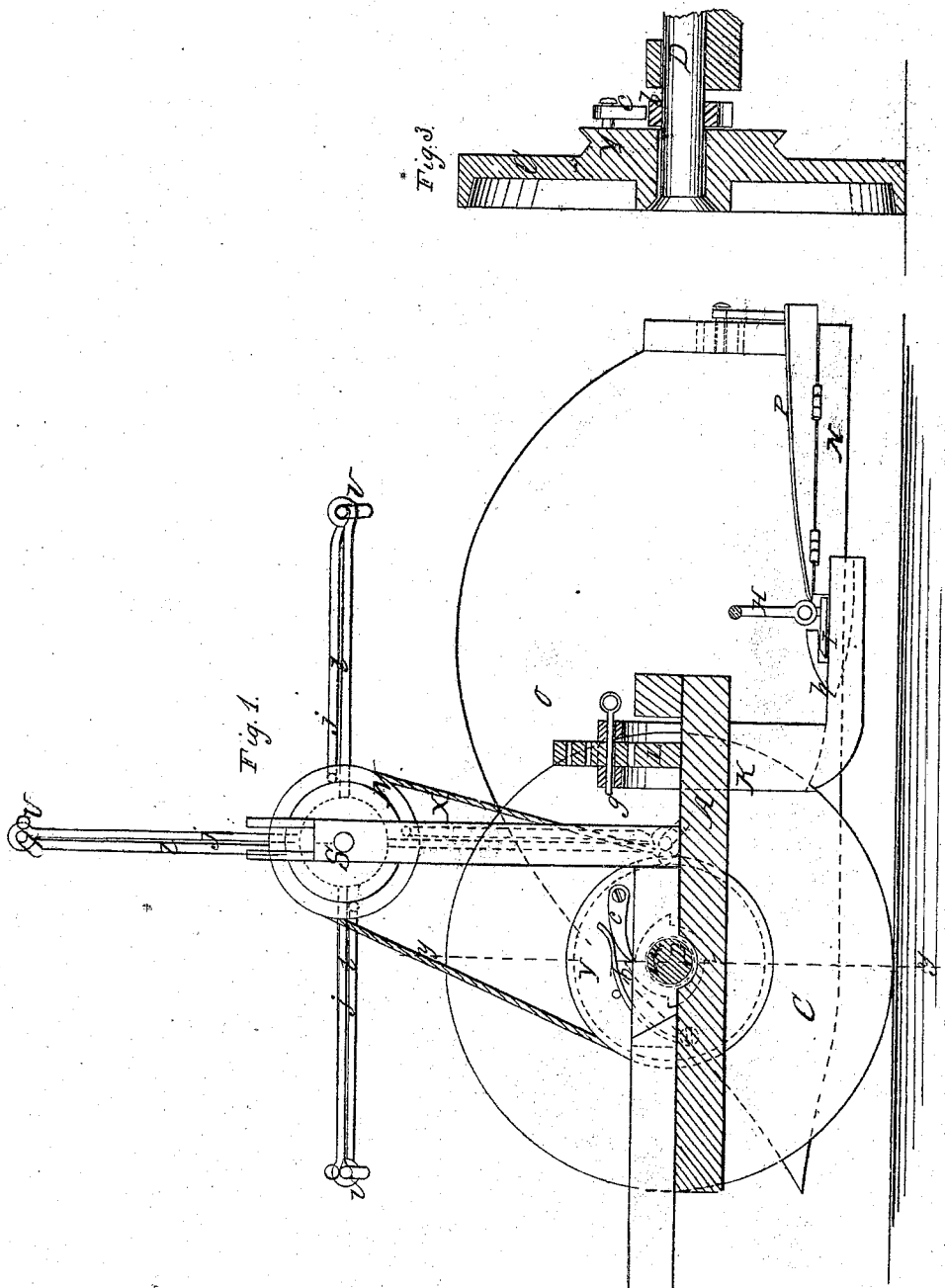

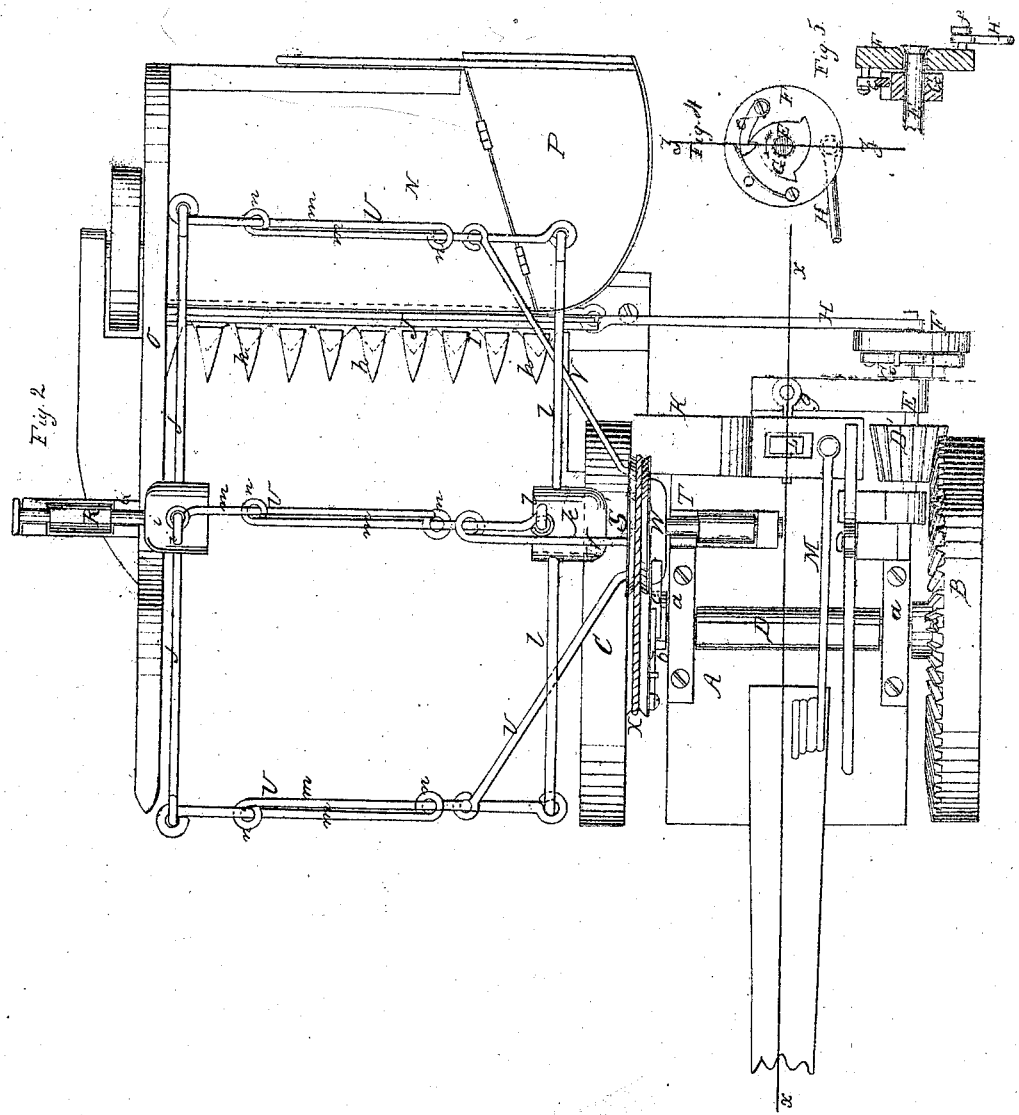

CHARLES P. WING, OF FAYETTEVILLE, NEW YORK.

IMPROVEMENT IN HARVESTERS.

Specification forming part of Letters Patent No. 32,443, dated May 28, 1861.

*To all whom it may concern:*

Be it known that I, CHARLES P. WING, of Fayetteville, in the county of Onondaga and State of New York, have invented a new and Improved Reaping and Mowing Machine; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of same; Fig. 3, a section of one of the driving-wheels, taken in the line $y\ y$, Fig. 1; Fig. 4, an inner side view of the crank-pulley by which the sickle is driven; Fig. 5, a section of same, taken in the line $z\ z$, Fig. 4.

Similar letters of reference indicate corresponding parts in the several figures.

The object of this invention is to so construct and arrange the reel as to allow the sickle and finger-bar to rise and fall to conform to the inequalities of the surface of the ground without affecting in the least the perfect operation of the reel.

To enable those skilled in the art to fully understand and construct my invention, I will proceed to describe it.

A represents the main frame of the machine, which may be constructed in any proper way and mounted on two wheels, B C, the axle D of which turns loosely in bearings $a\ a$ on the frame A. The outer wheel, B, is keyed to the axle D; but the inner wheel, C, is placed loosely on the axle, and is connected therewith by means of a ratchet, $b$, on the axle D, into which a pawl, $c$, on the wheel C catches. (See Fig. 1.) The wheel C is of rather larger diameter than wheel B, the object of which will be fully explained hereinafter. At the inner side of the wheel B, at its edge or periphery, there are cogs $d$, into which a pinion, D', at the back part of the main frame A gears. The pinion D' is on a shaft, E, the bearings of which are attached to the main frame. On the outer end of the shaft E there is placed loosely a crank-pulley, F, and there is keyed to the shaft E a ratchet, G, into which a pawl, $e$, on the crank-pulley F catches, the pawl $e$ being of hook form, as shown in Fig. 4. H is a connecting-rod, which is attached at one end to the pulley F by a wrist-pin, $f$, the opposite end of said rod being attached to the sickle I, which is of the ordinary reciprocating kind, and therefore does not require a minute description.

J is a finger-bar, the inner end of which is connected to an inclined bar, K, the latter being secured to an upright, L, on the main frame by means of a pin or bolt, $g$. (Shown in Figs. 1 and 2.) The bar K and its bolt $g$ are in line with the back part of the wheel B and pinion D', as shown clearly in Fig. 2. On the upper part of the bar K a spring, M, bears, said spring tending to counterpoise the finger-bar J and parts attached to it. The fingers $h$ may be secured to the bar J in the usual or in any proper way, and to the finger-bar the platform N is secured, the platform having a dividing-board, O, at its outer or grain end.

To the inner end of the platform N an inclined board, P, is attached, said board inclining upward from its inner to its outer end. This inclined board may be permanently attached to the platform N, or connected by hinges and arranged to admit of being adjusted to different degrees of elevation.

To the dividing-board O an upright, Q, is attached, the upper end of which is forked and forms bearings for a shaft, R. This shaft R has a hub, $i$, on its inner end, to which radial arms $j$ are attached, and a similar shaft, S, is at the upper part of an upright, T, on the main frame, the shaft S having also a hub, $k$, on it, with radial arms $l$ attached. The two shafts R S are in line with each other and the ends of the arms $j\ l$ are connected by extension-rods U, which are each formed of two parts, $m\ m$, each part $m$ having an eye, $n$, at its end, through which its fellow part passes loosely, as will be fully understood by referring to Fig. 2. The rods U are braced by rods V, which are secured to a pulley, W, on shaft S, the pulley W being driven by a belt, X, from a pulley, Y, at the inner side of wheel C.

From the above description it will be seen that as the machine is drawn along the larger wheel C will have a tendency to guide the machine from the standing grain and counteract side draft, and in consequence of the wheel C being placed loose on its axle D it may slip on the ground; or the axle may turn within the wheel, and the axle therefore will not be subjected to any undue torsional strain in consequence of the diversity of the diameters of the two wheels B C. At the same time the wheel C during its forward rotation is made to assist in the turning of the axle D. The crank-pulley F, in consequence of being connected to the shaft E by the ratchet G and pawl e, does not form a positive connection between shaft E and the sickle I, and the movement of the latter will be more uniform than usual. For instance, the wrist-pin f in approaching and passing the "centers" will be allowed to move faster than usual; or, in other words, the pulley F will be allowed to increase its speed, owing to the impetus given it between its centers by the movement of the sickle, and the pulley will move in advance of the movement of shaft E, the pawl e sliding forward on the teeth of the ratchet G. The finger-bar J and platform N are allowed to rise and fall to conform to the inequalities of the surface of the ground, and in consequence of having the reel formed with extension-rods U, as shown, the proper action of the reel will not be affected by said movement of the platform, as the extension-bars are allowed to elongate and contract under the movement of the finger-bar and platform.

Having thus described my invention, what I claim as new, and desire to secure by Letters Patent, is—

Constructing the reel with extension-rods or beaters U and two separate shafts, R S, attached, respectively, to the main frame and platform to operate as and for the purpose set forth.

CHARLES P. WING.

Witnesses:
 WM. HARMON,
 JOHN BROWN.